Sept. 25, 1934.    J. SINGER    1,974,661
CARD OR MEMORANDUM HOLDER
Filed Oct. 27, 1933
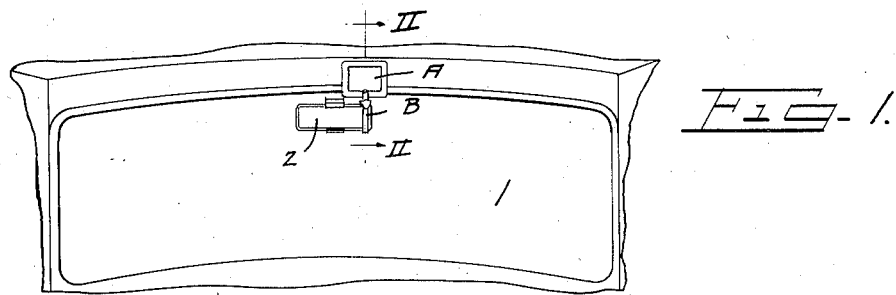
FIG. 1.
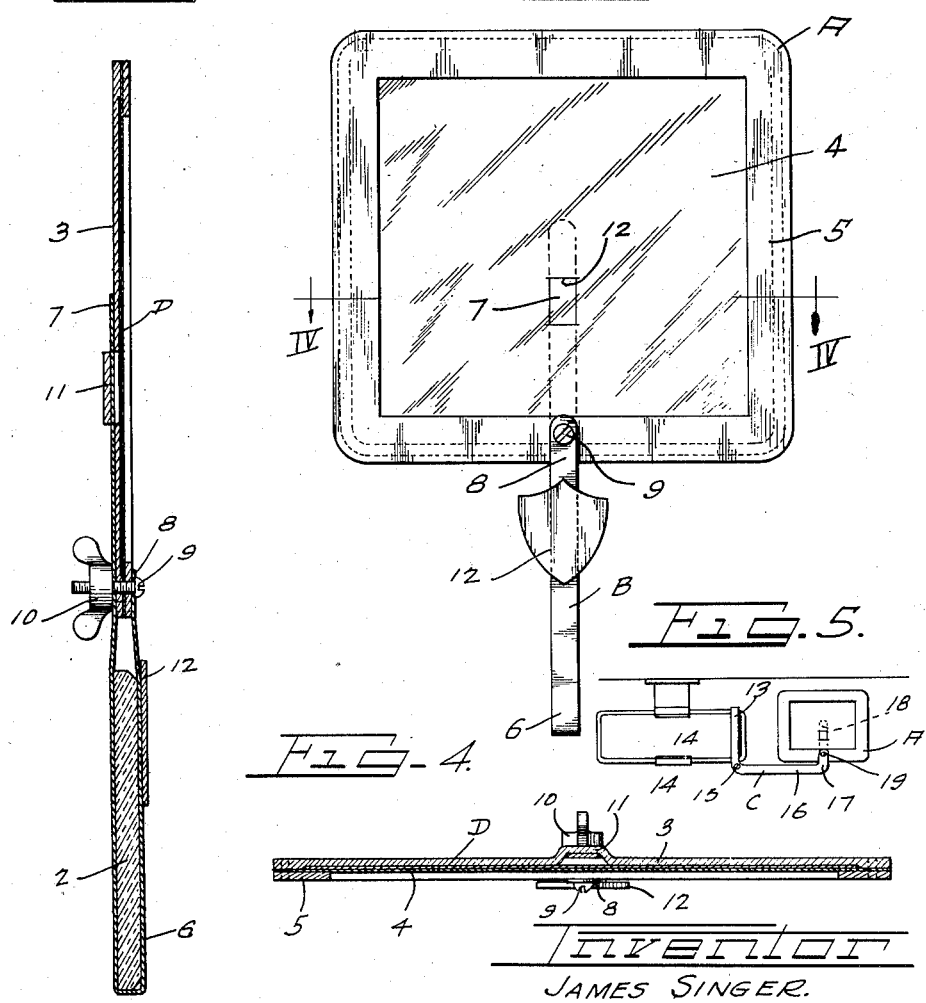
FIG. 2.  FIG. 3.
FIG. 5.
FIG. 4.
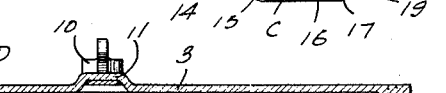
Inventor
JAMES SINGER.
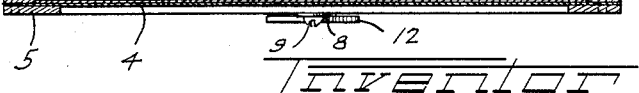

Patented Sept. 25, 1934

1,974,661

UNITED STATES PATENT OFFICE 1,974,661

CARD OR MEMORANDUM HOLDER

James Singer, Chicago, Ill.

Application October 27, 1933, Serial No. 695,433

5 Claims. (Cl. 40—10)

The present invention relates to a card or memorandum holder, and more particularly to a holder which may be readily applied to the rear vision mirror of an automobile, for holding cards, such as drivers' license cards, or other identification means, or any memoranda, in position to be readily observed and at the same time out of the way.

In many states, it is necessary that the operators of automotive vehicles, carry drivers' licenses, or other identification means, so as to be readily available on request by police or other duly qualified officers.

It is sometimes inconvenient to carry such memoranda in pocket-books, purses or pockets, especially in the winter time, when the drivers are heavily clad making it inconvenient to quickly reach the necessary identification means when requested.

The present invention has to do with a card holder, having a transparent face, which may be readily applied to a rear vision mirror, by being slipped over an end thereof and so fashioned as to be out of the way, and at the same time readily available for inspection when necessary.

An object of the present invention is to provide a card or memoranda holder which may be readily applied to a rear vision mirror of an automobile, and in which identification means or other memoranda may be inserted and readily available for inspection.

Another object of the invention is to provide a card or memoranda holder for application to the rear vision mirror of an automotive vehicle, and is so constructed as to protect the inserted matter, and at the same time allow observation thereof without having to remove the memorandum from the holder.

A further object of the invention is to provide a card or memoranda holder for application to a rear vision mirror of an automobile, by clamping action, and which may be readily applied to or removed from the mirror by sliding movement.

A still further object of the invention is to provide a card or memoranda holder for application to a rear vision mirror of an automobile, which is inexpensive to manufacture, easy to apply and efficient in use.

Another and yet further object of the invention is to provide a card or memoranda holder for application to a rear vision mirror of an automobile, which is so constructed as to protect the memoranda and still allow the vision thereof, and which at the same time is flexible so as to be bent in the event there is insufficient head room between the mirror and the top of the vehicle to allow the holder to be erect.

The above, other and further objects of the invention will be apparent from the following description, accompanying drawing, and appended claims.

Embodiments of the present invention are illustrated in the accompanying drawing, and the views thereof are as follows:

Figure 1 is an elevational view of a wind-shield of an automobile, looking from the inside of the vehicle, and showing a card holder, constructed in accordance with the principles of the present invention, secured to the rear vision mirror of the vehicle.

Figure 2 is an enlarged vertical sectional view taken substantially in the plane of line II—II of Fig. 1;

Figure 3 is an enlarged front elevational view of one form of the present invention;

Figure 4 is an enlarged horizontal sectional view taken substantially in the plane indicated by the line IV—IV of Fig. 3; and Figure 5 is an elevational view of a card holder, constructed in accordance with the principles of the present invention, and applied to a rear vision mirror of an automobile adjacent one end of the same.

The drawing will now be explained:

Figure 1 illustrates a wind-shield 1 of an automobile, and a rear vision mirror 2, supported in any convenient manner as is customary in such cases.

The card holder of the prsent invention is illustrated as comprising a pocket member, indicated generally at A, and a clamp, indicated generally at B.

The pocket member A is made of any inexpensive flexible material, such as leather, and comprises a back wall or portion 3 and a front transparent face 4. The face 4 may be made of mica, celluloid, or any suitable material. A binding 5 is stitched to the margins of the transparent face 4, and in turn is stitched to the back portion 3. The upper margin of the holder is left open for admission and withdrawal of cards and other data which may be inserted in the pocket member.

The clamp B, in the form of the invention illustrated in Figures 1 to 4 inclusive, is fashioned as a loop from narrow thin metal, of sufficient rigidity and as so fashioned comprises a looped part 6, and parallel end portions 7 and 8, which end portions are of unequal length. The end portions 7 and 8 are apertured to receive a clamping bolt 9 with which cooperates a wing nut 10.

The back portion 3 of the pocket member is provided with a loop 11, formed by splitting a part of the back portion 3 along the lines 12, illustrated in Fig. 3, and the end portion 7 of the clamping member is passed through the loop 11.

A marginal portion of the pocket member A, is provided with a suitable hole to receive the bolt 9, when the parts are assembled.

The holder is applied to a rear vision mirror 2, by slipping the looped portion 6 of the clamp over an end of the mirror, with the nut 10 loosened on the bolt to allow ready applicability of the clamp to the mirror. When the clamp has been applied to the mirror the nut is tightened and the holder is thus secured firmly to the mirror.

In the event there is insufficient head room between the mirror and the roof of the car, then, because of the flexibility of the holder A, this may be bent to accommodate itself to the low head room.

In order to enhance the appearance of the structure as a whole, an ornamental part, such for instance as the shield 12, may be secured to the front or shorter end 8 of the loop or clamp member B.

Sometimes because of the positions of the rear vision mirrors with respect to the roofs of cars, there is insufficient head room to apply the holder, of the form illustrated in Fig. 3, to such mirrors, even with the holder bent as heretofore described.

In order to apply the card holder of the present invention to mirrors, under such circumstances, the clamp member C, such as that illustrated in Fig. 5, may be employed.

The clamp member C has a looped portion 13 adapted to engage about one end of a rear vision mirror 14 with a locking bolt 15 extending through the looped portion adjacent a margin of the mirror. The clamp has an intermediate portion, 16, bent at substantially right angles to the part 13, and with parallel end members 17 and 18, at right angles to the intermediate portion 16, and parallel to the looped portion 13. The ends 17 and 18 are of unequal length for cooperating with a card holder A, of the form illustrated in Figure 3.

The card holder A is applied to the clamp C in the same manner as described with reference to the clamp B, that is the rear face of the card holder is provided with the loop 11 and the longer end 18 engaged within this loop while the shorter end 17 is secured against the front face of the card holder A adjacent its lower margin and there secured by the clamp bolt 19 and its cooperating nut.

In Fig. 4, a part, designated by the reference character D represents identification card or other data which may be inserted in the pocket member A.

It will be observed that the card holder of the present invention is readily adapted for the purpose designed, and easy to apply to a rear vision mirror, and is so arranged as to present for ready inspection at any time, such identification cards or memoranda which may be inserted in the card holder.

The device is made of inexpensive material thus enabling its sale at relatively low prices. It provides ready means for containing identification data, usually required by law to be carried by operators of motor vehicles, and is especially useful in those states requiring drivers licenses which have at all times to be with the driver when he is operating the vehicle.

Because of the easy manner of withdrawing cards from the holder, whenever drivers are changed, it is a simple matter to withdraw the identication card of one driver and insert the identification card of another driver.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. A holder for cards or memoranda adapted to be attached to a rear vision mirror of an automobile, said holder including a pocket member having one transparent face and a clamping member removably secured to the pocket member and adapted to be slipped over an end of the mirror, and a single instrumentality having a part passing through the faces of said pocket member and through said clamping member for securing said pocket member to a mirror.

2. A card holder for application to a rear vision mirror of an automobile, including in combination, a pocket member having one transparent face adapted to receive identification cards and the like, a clamp member adapted to secure said pocket member to the mirror, said clamp comprising a looped member having substantially parallel ends of unequal length, the longer end of said clamp engaging the back side of said pocket member and the shorter end engaging the front side of said member, and means passing through said ends for securing said clamp to said pocket member.

3. A card holder for application to a rear vision mirror of an automobile, including in combination, a pocket member having one transparent face adapted to receive identification cards and the like, a clamp member adapted to secure said pocket member to the mirror, said clamp comprising a looped member having substantially parallel ends of unequal length, the longer end of said clamp engaging the back side of said pocket member and the shorter end engaging the front side of said member, and means passing through said ends for securing said clamps to said pocket member, said last mentioned means serving to secure said clamp to said mirror.

4. A holder for cards adapted to be removably attached to a rear vision mirror of an automobile, said holder including a pocket member, and a clamp, said pocket member having one transparent face and a loop formed in its other or rear face, said clamp comprising a looped member having substantially parallel ends of unequal lengths, said holder loop slidably receiving the longer end of said clamp, said shorter end engaging the front face of said holder adjacent its lower margin, and said clamp being provided with means for securing it to said pocket member and to a mirror.

5. A card holder for application to a support on an automobile, said holder including a pocket member having a transparent face and a clamping member removably secured to the pocket member and adapted to engage about the support, said clamping member having an intermediate part for surrounding said support and having portions engaging the opposite sides of said pocket, and a bolt passing through said portions of said clamping member and through said pocket member for securing said holder to its support.

JAMES SINGER.